Figure 1:
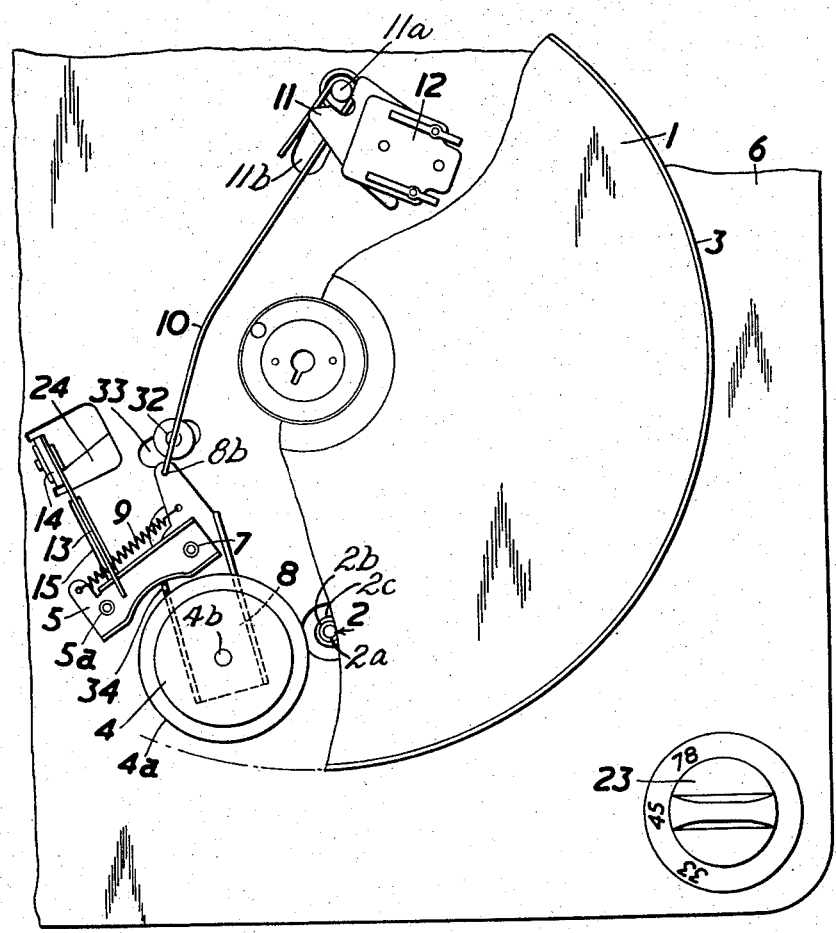

Sept. 15, 1959     H. DA COSTA     2,903,898
CONTROL LINKAGE FOR A GRAMOPHONE
CHANGE SPEED FRICTION DRIVE Filed Nov. 24, 1954     2 Sheets-Sheet 1

INVENTOR
HARRY DA COSTA
By William E. T. Bayly
ATTORNEY

Sept. 15, 1959     H. DA COSTA     2,903,898
CONTROL LINKAGE FOR A GRAMOPHONE
CHANGE SPEED FRICTION DRIVE Filed Nov. 24, 1954     2 Sheets-Sheet 2

INVENTOR
HARRY DA COSTA
BY William E. P. Brayley
ATTORNEY

United States Patent Office 2,903,898
Patented Sept. 15, 1959

2,903,898

CONTROL LINKAGE FOR A GRAMOPHONE CHANGE SPEED FRICTION DRIVE

Harry Da Costa, Snaresbrook, London, England, assignor to The Plessey Company Limited, Ilford, England, a British company Application November 24, 1954, Serial No. 470,952

Claims priority, application Great Britain November 25, 1953

6 Claims. (Cl. 74—201)

This invention relates to a change-speed friction drive for gramophones.

In my United States of America Patent No. 2,588,807 I have described and claimed a change speed friction drive for gramophones wherein an actuating mechanism transmits linear movement to a stepped ramp for moving vertically a carrier device, whereby a jockey pulley is raised or lowered in relation to a stepped driving pulley to drive a gramophone turntable at a pre-set speed.

An object of the present invention is to provide an improved and simplified means of raising and lowering the jockey pulley in relation to a stepped driving shaft.

Another object is to provide an improved control linkage for a gramophone change speed friction drive, in which forces radial to the drive spindle, produced by the change speed operation, are prevented from acting upon the drive spindle.

According to this invention the mechanism consists of a change speed drive for gramophones wherein an articulated lever supporting an idler pulley is pivotally mounted and slides vertically on a base plate, said pulley being adapted to frictionally engage with a stepped driving shaft and a gramophone turntable, and which further comprises a cam member pivoted to the base plate for movement about a horizontal axis and extending above and below said plate for controlling the vertical movement of said lever, means operatively connected to said cam member and a control knob for imparting intermittent vertical movement of the articulated lever for varying the relative position of the idler pulley in relation to the stepped driving shaft, switch mechanism for starting and stopping the gramophone and means coupled with said switch mechanism for moving the idler pulley into and out of engagement with the stepped driving shaft and turntable with the starting and stopping of the gramophone.

A feature of the invention is that the articulated lever is connected to a device for starting up the gramophone motor which enables the idler pulley fitted with a resilient rim to be moved into and out of engagement with the stepped driving shaft and gramophone turntable with the starting and stopping of the gramophone motor. An advantage of holding the idler pulley out of engagement with the driving shaft when not in use, prevents the resilient rim from being damaged, such for example from distorting the shape of the rim due to its pressing against one of the driving wheels.

Preferably the articulated lever is spring biased to retain the idler pulley in frictional engagement with the stepped driving shaft and internal rim of a gramophone turntable when the idler pulley is moved into the operative position.

The means for imparting intermittent vertical movement of the articulated lever may consist of a bell crank lever pivotally mounted on the underside of the base plate; one arm thereof is connected to the control knob and the other arm operatively engages a series of steps formed in the cam member beneath the base plate.

The invention will now be described with reference to the accompanying drawings in which—

Figure 2:
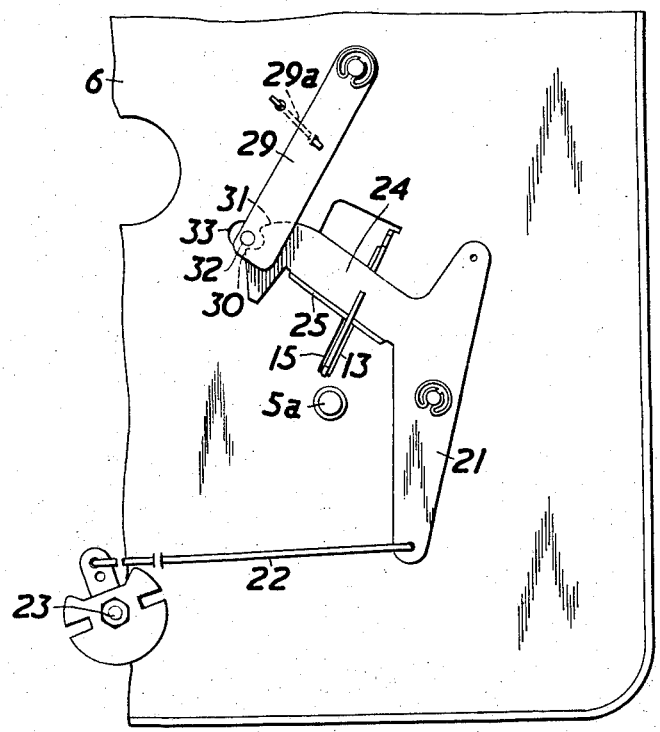

Fig. 1 is a plan view of a gramophone drive mechanism with part of the turntable broken away, Fig. 2 is a view of the underside of Fig. 1, and Figs. 3, 4 and 5 are details of the control mechanism in various stages of movement.

Referring to the drawing:

The illustrated gramophone drive mechanism comprises a turntable 1 which is rotatably mounted on a base plate 6 and a shaft 2 for example the shaft of an electric motor (not shown) which projects through the base plate 6 and drives a rim 3 on the turntable through the medium of a friction idler pulley 4 fitted with a rubber tire 4a. In order to enable the turntable to be driven at three speeds, for example 33, 45 and 78 r.p.m., the projecting end of the shaft 2 is formed with three stepped portions 2a, 2b and 2c of different diameters, the drive ratio from the shaft 2 to the rim 3 of the turntable 1 being varied by moving the idler pulley 4 into engagement with one or other of the three stepped portions 2a, 2b or 2c of the shaft 2. In order to enable the pulley 4 to perform this function, the shaft 4b of the pulley 4 is supported in a carrier plate 8, which is articulated at 7 to a bracket 5 provided with a pin 5a, and this pin is mounted in a bush 5b secured in the base 6 so as to allow the bracket 5 to perform both pivotal movement in a horizontal plane about the axis of the pin 5a and vertical movement in the axial direction of this pin. The carrier plate 8 and bracket 5 form an articulated lever, which is equipped with a spring 9 tending to bias the two parts of the lever towards the aligned position corresponding to a maximum distance between the pivots 5a and 4b, and thus normally applying the tire 4a of the pulley 4 under slight pressure to both the rim 3 and one of the steps 2a, 2b and 2c of the shaft 2, the pressures being equalised due to the free rotary motion of pin 5a in the bush 5b. A step 34 extending upwardly from the carrier plate 8 is provided for limiting the folding of the articulated lever 5, 8 and thus ensuring that when the member 11a is in the "off" position, the tire 4a is kept out of contact not only with the shaft 2 but also with the ring 3.

According to a feature of the invention the engagement of the pulley 4 with the spindle 2 and rim 3 is dependent upon a motor control member 11a, which through an actuating lever 11 operates the motor switch 12, being in the "on" position. With this object in view, a point 8b on the carrier plate 8, located at the opposite side of the articulation hinge pin 7 in relation to the pulley shaft 4b is coupled through a pull link 10 with the control member 11a so that when the control member moves from the "on" position to the illustrated "off" position along the slot 11b, the link 10 forces the pivot point 8b away from the pivot 5a, overcoming the pull of the spring 9, and thereby lifts the pulley 4 out of contact with the rim 3 and the spindle 2. In this manner the spindle 2 is prevented from causing indentation of the rubber tire 4a when the gramophone drive is switched off.

The step 2a, 2b or 2c of the driving shaft 2 which drives the pulley 4 when the switch operating member 11a is in the "on" position, is selected with the help of a cam plate 13 which is mounted for pivotal movement in a vertical plane by means of a horizontal pin 14a secured above the base plate 6, an edge portion of the bracket 5 being engaged between a pair of opposite lips of a recess 16 of the cam plate.

The up and down movement of the articulated lever 5, 8 according to the speed at which the turntable is desired to be driven, is effected with help of a lever 24 which, in a manner which will be described further below, can be moved, underneath the base plate 6 and parallel to the plane of the latter, in the direction of a slot 15 through which part of the cam plate 13 projects below the base plate 6. This projecting portion is formed with a cam surface including three steps 17, 18 and 19 separated by ledges 17a and 18a, and the edge of the lever 24 facing the stepped cam surface is turned down as shown at 25 in Figures 3 to 5, to form a suitable abutment surface for co-operation with that cam surface. Due to the fact that the pin 14a about which the cam plate 13 is pivoted, is located an appreciable distance above the base plate 6, kinematic conditions are such that pressure of the edge 25 of lever 24 against the edge 17a of cam plate 13 will produce a momentum tending to turn the plate 13 about the pivot pin 14a, and this will cause the cam plate to be turned until the step 18 rides on the lever 24. Similarly further movement of the lever 24 in the same direction will cause the turnover edge 25 of that lever to ride up the cam edge 18a until the shoulder 19 of cam plate 13 rests on the lever 24, whereupon further movement of the lever 24 is prevented by the fact that its bent-over edge portion 25 is then trapped in the cut-away portion 20 of the cam plate 13 as illustrated in Figure 5. When the lever 24 is moved back, the cam plate 13 will return step-by-step to the position illustrated in Figure 3, whereupon further anticlockwise movement is prevented by engagement of a stop surface 13a of cam plate 13 with the upper surface of the base plate 6, while at the same time further outward movement of the lever 24 is prevented by a stop projection 26 of the cam plate 13. The lever 24, as will be seen more clearly in Figure 2, forms one arm of a bell-crank lever 21 which is coupled by a link 22 to the speed control handle 23; a latch 29 loaded by a spring 29a has a projecting pin 32 co-operating with rests 30 and 31 at the free end of the lever 24 for resiliently retaining the lever 24 in the positions in which it co-operates with step 18 or 19 respectively of the cam lever 13.

Figure 3:
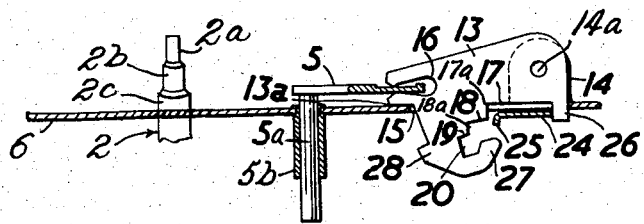
Figure 4:
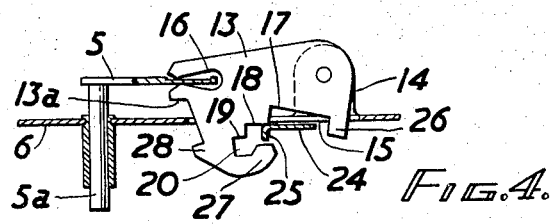
Figure 5:
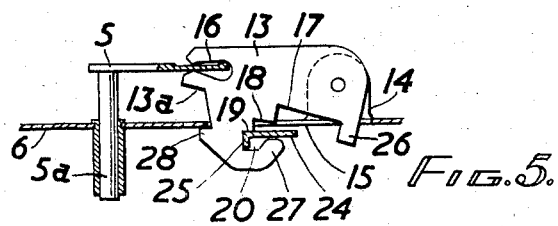

Figure 3 shows the cam lever 13 together with its actuating lever 24, 25 and with the bracket 5 to which the support plate 8 is articulated, in the position at which the idler pulley 4 engages the lowermost driving portion 2c of the shaft 2, corresponding to a turntable speed of 78 r.p.m., while Figures 4 and 5 similarly represent respectively the positions at which the turntable is driven at the speeds of 45 and 33.1/3 r.p.m.

It will be appreciated that with the mechanism of the invention when the turntable drive is switched off, the speed selector mechanism may be freely operated to move the pulley 4 to the level corresponding to any desired speed, without any risk of damage to the tire 4a, since the action of the pull link 10 keeps the pulley 4 out of engagement with either the rim 3 or the driving spindle 2. When on the other hand the motor is switched on, the driving spindle rotates and drives the pulley and turntable. In this case axial movement of the idler pulley is possible both in the direction of decreasing and increasing speeds. In the former case no difficulty can arise because the moving pulley merely moves from a larger-diameter portion to a smaller diameter portion of the shaft. Movement in the opposite direction, to change to a higher record speed, presents likewise no difficulty when the motor is running, since the rubber tire will in this case readily ride up the shoulder between adjacent steps 2a and 2b or 2b or 2c of the motor spindle.

I claim:
1. A change speed drive for gramophones wherein an articulated lever supporting an idler pulley is mounted on a base plate for pivotal movement about a vertical axis and vertical sliding movement, said pulley being adapted to frictionally engage with a stepped driving shaft and a gramophone turntable, a cam member pivoted to the base plate for movement about a horizontal axis and extending above and below said plate for controlling the vertical movement of said lever, a manually operated speed-control member means operatively connected to said cam member and to said speed control member for imparting intermittent vertical movement of the articulated lever for varying the relative position of the idler pulley in relation to the stepped driving shaft, switch mechanism for starting and stopping the gramophone and means coupled with said switch mechanism for moving the idler pulley into and out of engagement with the stepped driving shaft and turntable with the starting and stopping of the gramophone.

2. A change speed drive for gramophones according to claim 1 wherein a spring biasing means is provided for maintaining the idler pulley in frictional engagement with the stepped driving shaft and turntable when released into the operative position.

3. A change speed drive for gramophones according to claim 1 wherein the cam member is provided with two stops which alternately engage with the base plate to limit the movement of the member at the highest and lowest speed of the turntable.

4. A change speed drive for gramophones according to claim 1 wherein the articulated lever consists of a bracket having a downwardly extending spindle which moves vertically and rotates in a bearing provided in the base plate, a rectangular carrier supporting the idler pulley, said carrier being pivotally connected to said bracket and a helical spring attached to the bracket and carrier for maintaining the idler pulley in the operative position.

5. A change speed drive according to claim 1 wherein the means for imparting intermittent vertical movement of the articulated lever consist of a bell crank lever pivotally mounted on the underside of the base plate for movement about a vertical axis, one arm of said bell crank lever being connected to the speed control member, while the other arm has one edge turned over and engaging a series of steps formed in the cam member beneath the base plate.

6. In a change-speed friction drive for a gramophone including a horizontal base plate equipped with a motor-driven stepped spindle and provided with a slot, a rotatable turntable having a depending rim, and an idler pulley for frictionally transmitting the drive from a selected section of the stepped spindle to said rim, the combination comprising an articulated lever including a support plate by which said pulley is rotatably supported, a bracket pivoted to said support plate for relative movement about a vertical axis of articulation and mounted in the base plate for pivotal movement about a fixed vertical axis spaced from said axis of articulation, and a spring biasing said support plates relative to said bracket in such a direction as to increase the distance of the pulley from said fixed axis, a vertical cam plate extending through the slot in the base plate and pivotally supported on said base plate for movement about a horizontal axis, said cam plate having a part extending under said bracket to support the weight of the articulated lever and of the pulley, and a stepped cam surface below the base plate, a speed-selector element movable below the base plate in a direction approximately parallel to the base plate and to the plane of said cam plate and having an edge co-operating with said stepped cam surface for selectively, through the medium of the cam plate, raising or lowering the pulley to the level of a selected section of the spindle, a manually operable switch-control member for the motor drive of the spindle, having an "on" and an "off" position, and mechanical linkage means operatively interconnecting the switch control member and articulated lever for folding said lever, against the action of its loading spring, out of engagement with the spindle when said control member is moved to its "off" position.

References Cited in the file of this patent

UNITED STATES PATENTS

| | | |
|---|---|---|
| 2,564,290 | Williamson et al. | Aug. 14, 1951 |
| 2,584,580 | Hardy | Feb. 5, 1952 |
| 2,588,807 | Da Costa | Mar. 11, 1952 |
| 2,756,603 | Wei Hwa Tsien | July 31, 1956 |